(12) United States Patent  
Drummond et al.

(10) Patent No.: US 8,362,885 B2  
(45) Date of Patent: *Jan. 29, 2013

(54) VEHICULAR REARVIEW MIRROR SYSTEM

(75) Inventors: John P. Drummond, Glenageary (IE); Niall R. Lynam, Holland, MI (US)

(73) Assignee: Donnelly Corporation, Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/276,655

(22) Filed: Oct. 19, 2011

(65) Prior Publication Data

US 2012/0032780 A1 Feb. 9, 2012

Related U.S. Application Data

(63) Continuation of application No. 12/693,720, filed on Jan. 26, 2010, now Pat. No. 8,044,777, which is a continuation of application No. 11/764,559, filed on Jun. 18, 2007, now Pat. No. 7,679,488, which is a continuation of application No. 11/288,649, filed on (Continued)

(51) Int. Cl.
 *B60Q 1/00* (2006.01)
 *B60C 23/02* (2006.01)
 *G02B 5/04* (2006.01)

(52) U.S. Cl. ............... 340/425.5; 340/815.4; 348/143; 348/148; 362/494; 307/10.1

(58) Field of Classification Search ............... 340/425.5; 362/494; 348/148

See application file for complete search history.

(56) References Cited

U.S. PATENT DOCUMENTS

| | | |
|---|---|---|
| 4,580,875 A | 4/1986 | Bechtel et al. |
| 4,712,879 A | 12/1987 | Lynam et al. |
| 4,871,917 A | 10/1989 | O'Farrell et al. |
| 4,917,477 A | 4/1990 | Bechtel et al. |
| 4,930,742 A | 6/1990 | Schofield et al. |
| 4,937,945 A | 7/1990 | Schofield et al. |
| 4,953,305 A | 9/1990 | Van Lente et al. |
| 4,973,844 A | 11/1990 | O'Farrell et al. |
| 5,066,112 A | 11/1991 | Lynam et al. |
| 5,073,012 A | 12/1991 | Lynam |
| 5,076,673 A | 12/1991 | Lynam et al. |
| 5,076,674 A | 12/1991 | Lynam |
| 5,115,346 A | 5/1992 | Lynam |
| 5,140,455 A | 8/1992 | Varaprasad et al. |
| 5,142,407 A | 8/1992 | Varaprasad et al. |
| 5,145,609 A | 9/1992 | Varaprasad et al. |
| 5,151,816 A | 9/1992 | Varaprasad et al. |
| 5,151,824 A | 9/1992 | O'Farrell |
| 5,189,537 A | 2/1993 | O'Farrell |
| 5,193,029 A | 3/1993 | Schofield et al. |

(Continued)

FOREIGN PATENT DOCUMENTS

EP 1103420 5/2001

*Primary Examiner* — Donnie Crosland (74) *Attorney, Agent, or Firm* — Gardner, Linn, Burkhart & Flory, LLP (57) ABSTRACT

A vehicular rearview mirror system includes an interior rearview mirror assembly having an interior electrochromic reflective element. The interior rearview mirror assembly includes a control that has circuitry operable to provide a drive signal to the reflective element to vary the reflectance level of the interior electrochromic reflective element. The control includes a bus interface that interfaces with a vehicle bus of the equipped vehicle. The interior rearview mirror system includes a forward-facing camera. The control may control at least one of (a) operation of a video display, (b) operation of the forward-facing camera and (c) operation of a headlight control for controlling a headlight of the equipped vehicle. The interior rearview mirror assembly may include a video display operable to display video information for viewing by a driver of the vehicle.

44 Claims, 3 Drawing Sheets

Related U.S. Application Data

Nov. 29, 2005, now Pat. No. 7,233,230, which is a continuation of application No. 10/694,595, filed on Oct. 27, 2003, now Pat. No. 6,970,073, which is a continuation of application No. 10/134,716, filed on Apr. 29, 2002, now Pat. No. 6,639,519, which is a continuation of application No. 09/820,013, filed on Mar. 28, 2001, now Pat. No. 6,396,408.

(60) Provisional application No. 60/196,577, filed on Mar. 31, 2000.

(56) References Cited

U.S. PATENT DOCUMENTS

| | | | |
|---|---|---|---|
| 5,204,778 | A | 4/1993 | Bechtel |
| 5,208,701 | A | 5/1993 | Maeda |
| 5,239,405 | A | 8/1993 | Varaprasad et al. |
| 5,239,406 | A | 8/1993 | Lynam |
| 5,245,422 | A | 9/1993 | Borcherts et al. |
| 5,253,109 | A | 10/1993 | O'Farrell et al. |
| 5,276,389 | A | 1/1994 | Levers |
| 5,285,060 | A | 2/1994 | Larson et al. |
| 5,289,182 | A | 2/1994 | Brillard et al. |
| 5,289,321 | A | 2/1994 | Secor |
| 5,305,012 | A | 4/1994 | Faris |
| 5,307,136 | A | 4/1994 | Saneyoshi |
| 5,309,137 | A | 5/1994 | Kajiwara |
| 5,313,072 | A | 5/1994 | Vachss |
| 5,325,096 | A | 6/1994 | Pakett |
| 5,325,386 | A | 6/1994 | Jewell et al. |
| 5,329,206 | A | 7/1994 | Slotkowski et al. |
| 5,331,312 | A | 7/1994 | Kudoh |
| 5,336,980 | A | 8/1994 | Levers |
| 5,341,437 | A | 8/1994 | Nakayama |
| 5,351,044 | A | 9/1994 | Mathur et al. |
| 5,355,118 | A | 10/1994 | Fukuhara |
| 5,355,245 | A | 10/1994 | Lynam |
| 5,374,852 | A | 12/1994 | Parkes |
| 5,386,285 | A | 1/1995 | Asayama |
| 5,394,333 | A | 2/1995 | Kao |
| 5,406,395 | A | 4/1995 | Wilson et al. |
| 5,406,414 | A | 4/1995 | O'Farrell et al. |
| 5,410,346 | A | 4/1995 | Saneyoshi et al. |
| 5,414,257 | A | 5/1995 | Stanton |
| 5,414,461 | A | 5/1995 | Kishi et al. |
| 5,416,313 | A | 5/1995 | Larson et al. |
| 5,416,318 | A | 5/1995 | Hegyi |
| 5,416,478 | A | 5/1995 | Morinaga |
| 5,424,865 | A | 6/1995 | Lynam |
| 5,424,952 | A | 6/1995 | Asayama |
| 5,426,294 | A | 6/1995 | Kobayashi et al. |
| 5,430,431 | A | 7/1995 | Nelson |
| 5,432,496 | A | 7/1995 | Lin |
| 5,434,407 | A | 7/1995 | Bauer et al. |
| 5,440,428 | A | 8/1995 | Hegg et al. |
| 5,444,478 | A | 8/1995 | Lelong et al. |
| 5,446,576 | A | 8/1995 | Lynam et al. |
| 5,451,822 | A | 9/1995 | Bechtel et al. |
| 5,457,493 | A | 10/1995 | Leddy et al. |
| 5,461,357 | A | 10/1995 | Yoshioka et al. |
| 5,461,361 | A | 10/1995 | Moore |
| 5,469,298 | A | 11/1995 | Suman et al. |
| 5,471,515 | A | 11/1995 | Fossum et al. |
| 5,475,494 | A | 12/1995 | Nishida et al. |
| 5,498,866 | A | 3/1996 | Bendicks et al. |
| 5,500,760 | A | 3/1996 | Varaprasad et al. |
| 5,500,766 | A | 3/1996 | Stonecypher |
| 5,510,983 | A | 4/1996 | Iino |
| 5,515,448 | A | 5/1996 | Nishitani |
| 5,521,633 | A | 5/1996 | Nakajima et al. |
| 5,523,877 | A | 6/1996 | Lynam |
| 5,528,698 | A | 6/1996 | Kamei et al. |
| 5,529,138 | A | 6/1996 | Shaw et al. |
| 5,530,240 | A | 6/1996 | Larson et al. |
| 5,530,420 | A | 6/1996 | Tsuchiya et al. |
| 5,535,314 | A | 7/1996 | Alves et al. |
| 5,537,003 | A | 7/1996 | Bechtel et al. |
| 5,539,397 | A | 7/1996 | Asanuma et al. |
| 5,541,590 | A | 7/1996 | Nishio |
| 5,550,677 | A | 8/1996 | Schofield et al. |
| 5,555,555 | A | 9/1996 | Sato et al. |
| 5,567,360 | A | 10/1996 | Varaprasad et al. |
| 5,568,027 | A | 10/1996 | Teder |
| 5,574,443 | A | 11/1996 | Hsieh |
| 5,581,464 | A | 12/1996 | Woll et al. |
| 5,594,222 | A | 1/1997 | Caldwell |
| 5,610,756 | A | 3/1997 | Lynam et al. |
| 5,611,966 | A | 3/1997 | Varaprasad et al. |
| 5,614,788 | A | 3/1997 | Mullins et al. |
| 5,619,370 | A | 4/1997 | Guinosso |
| 5,634,709 | A | 6/1997 | Iwama |
| 5,642,299 | A | 6/1997 | Hardin et al. |
| 5,648,835 | A | 7/1997 | Uzawa |
| 5,650,944 | A | 7/1997 | Kise |
| 5,660,454 | A | 8/1997 | Mori et al. |
| 5,661,303 | A | 8/1997 | Teder |
| 5,661,455 | A | 8/1997 | Van Lente et al. |
| 5,666,028 | A | 9/1997 | Bechtel et al. |
| 5,668,663 | A | 9/1997 | Varaprasad et al. |
| 5,670,935 | A | 9/1997 | Schofield et al. |
| 5,677,851 | A | 10/1997 | Kingdon et al. |
| 5,680,245 | A | 10/1997 | Lynam |
| 5,699,044 | A | 12/1997 | Van Lente et al. |
| 5,724,187 | A | 3/1998 | Varaprasad et al. |
| 5,724,316 | A | 3/1998 | Brunts |
| 5,737,226 | A | 4/1998 | Olson et al. |
| 5,760,826 | A | 6/1998 | Nayar |
| 5,760,828 | A | 6/1998 | Cortes |
| 5,760,931 | A | 6/1998 | Saburi et al. |
| 5,760,962 | A | 6/1998 | Schofield et al. |
| 5,761,094 | A | 6/1998 | Olson et al. |
| 5,765,116 | A | 6/1998 | Wilson-Jones et al. |
| 5,781,437 | A | 7/1998 | Wiemer et al. |
| 5,786,772 | A | 7/1998 | Schofield et al. |
| 5,790,403 | A | 8/1998 | Nakayama |
| 5,790,973 | A | 8/1998 | Blaker et al. |
| 5,793,308 | A | 8/1998 | Rosinski et al. |
| 5,793,420 | A | 8/1998 | Schmidt |
| 5,796,094 | A | 8/1998 | Schofield et al. |
| 5,798,575 | A | 8/1998 | O'Farrell et al. |
| 5,798,688 | A | 8/1998 | Schofield |
| 5,808,777 | A | 9/1998 | Lynam et al. |
| 5,835,255 | A | 11/1998 | Miles |
| 5,837,994 | A | 11/1998 | Stam et al. |
| 5,844,505 | A | 12/1998 | Van Ryzin |
| 5,844,682 | A | 12/1998 | Kiyomoto et al. |
| 5,845,000 | A | 12/1998 | Breed et al. |
| 5,848,802 | A | 12/1998 | Breed et al. |
| 5,850,176 | A | 12/1998 | Kinoshita et al. |
| 5,850,254 | A | 12/1998 | Takano et al. |
| 5,864,419 | A | 1/1999 | Lynam |
| 5,867,591 | A | 2/1999 | Onda |
| 5,871,275 | A | 2/1999 | O'Farrell et al. |
| 5,877,707 | A | 3/1999 | Kowalick |
| 5,877,897 | A | 3/1999 | Schofield et al. |
| 5,878,370 | A | 3/1999 | Olson |
| 5,883,739 | A | 3/1999 | Ashihara et al. |
| 5,884,212 | A | 3/1999 | Lion |
| 5,890,021 | A | 3/1999 | Onoda |
| 5,896,085 | A | 4/1999 | Mori et al. |
| 5,899,956 | A | 5/1999 | Chan |
| 5,910,854 | A | 6/1999 | Varaprasad et al. |
| 5,914,815 | A | 6/1999 | Bos |
| 5,923,027 | A | 7/1999 | Stam et al. |
| 5,929,786 | A | 7/1999 | Schofield et al. |
| 5,940,120 | A | 8/1999 | Frankhouse et al. |
| 5,949,331 | A | 9/1999 | Schofield et al. |
| 5,956,181 | A | 9/1999 | Lin |
| 5,959,367 | A | 9/1999 | O'Farrell et al. |
| 5,959,555 | A | 9/1999 | Furuta |
| 5,963,247 | A | 10/1999 | Banitt |
| 5,971,552 | A | 10/1999 | O'Farrell et al. |
| 5,986,796 | A | 11/1999 | Miles |
| 5,990,469 | A | 11/1999 | Bechtel et al. |

| | | |
|---|---|---|
| 5,998,929 A | 12/1999 | Bechtel et al. |
| 6,001,486 A | 12/1999 | Varaprasad et al. |
| 6,002,511 A | 12/1999 | Varaprasad et al. |
| 6,008,486 A | 12/1999 | Stam et al. |
| 6,019,411 A | 2/2000 | Carter et al. |
| 6,019,475 A | 2/2000 | Lynam et al. |
| 6,020,704 A | 2/2000 | Buschur |
| 6,049,171 A | 4/2000 | Stam et al. |
| 6,056,410 A | 5/2000 | Hoekstra et al. |
| 6,066,933 A | 5/2000 | Ponziana |
| 6,068,380 A | 5/2000 | Lynn et al. |
| 6,084,519 A | 7/2000 | Coulling et al. |
| 6,087,012 A | 7/2000 | Varaprasad et al. |
| 6,087,953 A | 7/2000 | DeLine et al. |
| 6,089,721 A | 7/2000 | Schierbeek |
| 6,097,023 A | 8/2000 | Schofield et al. |
| 6,097,024 A | 8/2000 | Stam et al. |
| 6,099,131 A | 8/2000 | Fletcher et al. |
| 6,116,743 A | 9/2000 | Hoek |
| 6,124,647 A | 9/2000 | Marcus et al. |
| 6,124,886 A | 9/2000 | DeLine et al. |
| 6,130,421 A | 10/2000 | Bechtel et al. |
| 6,139,172 A | 10/2000 | Bos et al. |
| 6,144,022 A | 11/2000 | Tenenbaum et al. |
| 6,154,306 A | 11/2000 | Varaprasad et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,207,083 B1 | 3/2001 | Varaprasad et al. |
| 6,210,008 B1 | 4/2001 | Hoekstra et al. |
| 6,217,181 B1 | 4/2001 | Lynam et al. |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,245,262 B1 | 6/2001 | Varaprasad et al. |
| 6,250,148 B1 | 6/2001 | Lynam |
| 6,255,639 B1 | 7/2001 | Stam et al. |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,278,377 B1 | 8/2001 | DeLine et al. |
| 6,285,393 B1 | 9/2001 | Shimoura et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,299,315 B2 | 10/2001 | Hoekstra et al. |
| 6,299,316 B1 | 10/2001 | Fletcher et al. |
| 6,302,545 B1 | 10/2001 | Schofield et al. |
| 6,305,807 B1 | 10/2001 | Schierbeek |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,333,759 B1 | 12/2001 | Mazzilli |
| 6,340,849 B1 | 1/2002 | Kramer et al. |
| 6,340,850 B2 | 1/2002 | O'Farrell et al. |
| 6,341,523 B2 | 1/2002 | Lynam |
| 6,353,392 B1 | 3/2002 | Schofield et al. |
| 6,362,771 B1 | 3/2002 | Schofield et al. |
| 6,366,213 B2 | 4/2002 | DeLine et al. |
| 6,370,329 B1 | 4/2002 | Teuchert |
| 6,379,013 B1 | 4/2002 | Bechtel et al. |
| 6,386,742 B1 | 5/2002 | DeLine et al. |
| 6,396,408 B2 | 5/2002 | Drummond et al. |
| 6,406,152 B1 | 6/2002 | Hoekstra et al. |
| 6,420,036 B1 | 7/2002 | Varaprasad et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,445,287 B1 | 9/2002 | Schofield et al. |
| 6,447,124 B1 | 9/2002 | Fletcher et al. |
| 6,465,904 B2 | 10/2002 | O'Farrell et al. |
| 6,472,979 B2 | 10/2002 | Schofield et al. |
| 6,474,820 B1 | 11/2002 | Hoekstra et al. |
| 6,483,438 B2 | 11/2002 | DeLine et al. |
| 6,498,620 B2 | 12/2002 | Schofield et al. |
| 6,515,378 B2 | 2/2003 | Drummond et al. |
| 6,516,664 B2 | 2/2003 | Lynam |
| 6,522,451 B1 | 2/2003 | Lynam |
| 6,547,404 B2 | 4/2003 | Schierbeek |
| 6,595,649 B2 | 7/2003 | Hoekstra et al. |
| 6,611,202 B2 | 8/2003 | Schofield et al. |
| 6,639,519 B2 | 10/2003 | Drummond et al. |
| 6,642,851 B2 | 11/2003 | DeLine et al. |
| 6,657,708 B1 | 12/2003 | Drevillon |
| 6,672,744 B2 | 1/2004 | DeLine et al. |
| 6,679,608 B2 | 1/2004 | Bechtel et al. |
| 6,690,268 B2 | 2/2004 | Schofield et al. |
| 6,700,692 B2 | 3/2004 | Tonar et al. |
| 6,717,712 B2 | 4/2004 | Lynam et al. |
| 6,742,904 B2 | 6/2004 | Bechtel et al. |
| 6,904,348 B2 | 6/2005 | Drummond et al. |
| 6,906,632 B2 | 6/2005 | DeLine et al. |
| 6,956,302 B2 | 10/2005 | O'Farrell et al. |
| 6,970,073 B2 | 11/2005 | Drummond et al. |
| 7,233,230 B2 | 6/2007 | Drummond et al. |
| 7,679,488 B2 | 3/2010 | Drummond et al. |
| 8,044,777 B2 | 10/2011 | Drummond et al. |
| 2003/0202249 A1 | 10/2003 | Schierbeek |
| 2004/0047043 A1 | 3/2004 | Hoekstra et al. |

VEHICULAR REARVIEW MIRROR SYSTEM

CROSS-REFERENCE TO RELATED APPLICATIONS

This application is a continuation of U.S. patent application Ser. No, 12/693,720, filed Jan, 6, 2010, now U.S. Pat. No. 8,044,777, which is a continuation of U.S. patent application Ser. No. 11/764,559, filed Jun. 18, 2007, now U.S. Pat. No. 7,679,488, which is a continuation of U.S. patent application Ser. No. 11/288,649, filed Nov. 29, 2005, now U.S. Pat. No. 7,233,230, which is a continuation of U.S. patent application Ser. No, 10/694,595, filed Oct. 27, 2003, now U.S. Pat. No. 6,970,073, which is a continuation of U.S. patent application Ser. No, 10/134,716, filed on Apr. 29, 2002, now U.S. Pat. No. 6,639,519, which is a continuation of U.S. patent application Ser. No. 09/820,013, filed on Mar. 28, 2001, now U.S. Pat. No. 6,396,408, which claims priority from U.S. provisional patent application Ser. No. 60/196,577, filed on Mar. 31, 2000, the disclosures of which are hereby incorporated herein by reference in their entireties.

BACKGROUND OF THE INVENTION

This invention relates generally to vehicle rearview mirror systems and, more particularly, to digital electrochromic rearview mirror systems.

Digital electrochromic mirror systems are described in commonly assigned U.S. Pat. No. 6,089,721 entitled DIGITAL ELECTROCHROMIC MIRROR SYSTEM and U.S. Pat. No. 6,056,410 entitled DIGITAL ELECTROCHROMIC MIRROR SYSTEM, the disclosures of which are hereby incorporated herein by reference. Such systems are capable of controlling the reflectance level of an electrochromic element from the output of a microcomputer.

Various forms of vehicle communication systems have been developed including wired networks, or busses, operating one of several known protocols. These include a LIN (Local Interconnect Network), a LAN (Local Area Network), a CAN (Car or Controlled Area Network), and the like. An advantage of such vehicle networks is that the wire harness to the mirror can be minimized to as few as three wires or so, yet provide a variety of functions. Wireless communication networks utilizing radio frequency and/or infrared communication for vehicles have also been proposed, such as those utilizing the BLUETOOTH protocol. Such wireless communication and the BLUETOOTH protocol are described in more detail in commonly assigned U.S. patent application Ser. No. 09/793,002, filed Feb. 26, 2001, entitled VIDEO MIRROR SYSTEMS INCORPORATING AN ACCESSORY MODULE, now U.S. Pat. No. 6,690,268, the disclosure of which is hereby incorporated herein by reference.

Trainable garage door openers, such as a universal garage door opener available from Johnson Controls/Prince Corporation, Holland, Mich. under the trade name HOMELINK™, include a transmitter for a universal home access system, which replaces the switch in a household garage door opener that opens/closes the garage door. A garage door opener communicating with a smart switch that is programmable to a household specific code that is of the rolling code type, such as is available from TRW Automotive, Farmington Hills, Mich. under the trade name KWIKLINK™, is known to be mounted within vehicles. As described in commonly assigned U.S. Pat. No. 6,172,613, the disclosure of which is hereby incorporated herein by reference, the universal garage door opener HOMELINK™ unit or the universal home access KWIKLINK™ unit may be mounted at, within, or on an interior rearview mirror assembly. The KWIKLINK™ system is a low-current device that can, optionally, be operated off of a battery source, such as a long-life lithium battery. It is also compact and lightweight as executed on a single-or double-sided printed circuit board.

SUMMARY OF THE INVENTION

The present invention provides a new and unique combination of a digital electrochromic mirror system, a vehicle accessory and a vehicle network, and, more particularly, a combination of a digital electrochromic mirror system, a garage door opener and a vehicle network. According to an aspect of the invention, a vehicular rearview mirror system includes a digital electrochromic mirror system having a digital drive circuit and an electrochromic reflective element. The reflective element assumes a partial reflectance level in response to a drive signal. The drive circuit provides a drive signal to the reflectance element. The mirror system further includes a garage door opener including a transmitter and a logic circuit. The logic circuit supplies signals to the transmitter for transmitting garage door opening signals. The mirror system further includes a microcontroller which defines, at least in part, the digital drive circuit and the logic circuit. In this manner, the digital electrochromic mirror system has components in common with the garage door opener. According to this aspect of the invention, the microcontroller communicates over a vehicle network with at least a module performing at least one other vehicle function. The vehicle network may have at least wired network connections and may further have wireless connections. The vehicle network may have a protocol selected from the group consisting of a LIN, a CAN, or a LAN.

According to this aspect of the invention, the digital drive circuit and the logic circuit may be mounted on a common circuit board. Power to the digital drive circuit and logic circuit may be supplied from a battery, preferably a rechargeable battery, that is separate from the vehicle ignition. The battery may be charged from a solar power system.

According to another aspect of the invention, a vehicle rearview mirror system includes an interior rearview mirror system made up of an electrochromic reflective element, a housing for the electrochromic reflective element and a circuit board in the housing. The electrochromic reflective element assumes a partial reflectance level in response to a drive signal. A digital electrochromic drive circuit is provided on the circuit board and supplies a drive signal to the reflective element. The mirror system further includes a garage door opener. The garage door opener includes a transmitter and a logic circuit, at least one of which (and preferably, both) is on the circuit board, and share Components with, the electrochromic drive circuit. The logic circuit supplies signals to the transmitter for transmitting garage door opening signals. The garage door opener may, optionally and preferably, also serve as a receiver or a transceiver for a tire pressure status monitoring/display system, such as disclosed in commonly assigned U.S. patent application Ser. No. 09/513,941, filed Feb. 28, 2000, entitled TIRE INFLATION ASSISTANCE MONITORING SYSTEM, now U.S. Pat. No. 6,294,989, and U.S. patent application Ser. No, 09/710,016, filed Nov. 10, 2000, entitled TIRE INFLATION ASSISTANCE MONITORING SYSTEM, now U.S. Pat. No. 6,445,287, the disclosures of which are hereby incorporated herein by reference, and thus have a dual tire pressure monitoring/display and garage door opener function. The mirror system further includes a microcontroller which defines, at least in part, the digital drive circuit and the logic circuit. The digital electrochromic mirror system has components in common with the garage door opener. The microcontroller communicates over a vehicle network with at least one module performing at least one other vehicle function.

These and other objects, advantages and features of this invention will become apparent upon review of the following specification in conjunction with the drawings.

DESCRIPTION OF THE PREFERRED EMBODIMENT

Figure 1:
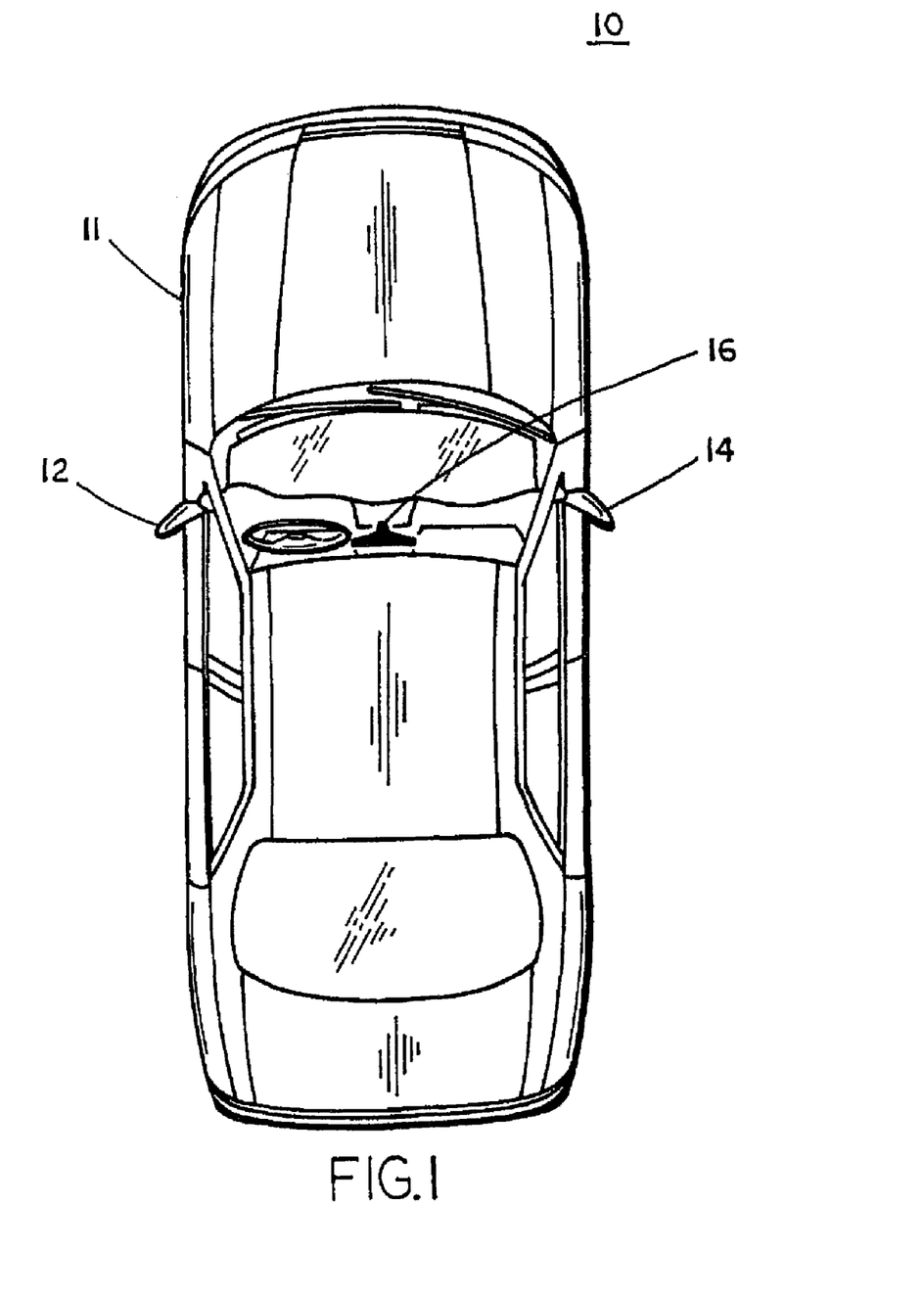
FIG. 1 is a top plan view of a vehicle having a vehicular rearview mirror system, according to the invention.

Referring now specifically to the drawings, and the illustrative embodiments depicted therein, a vehicular rearview mirror system 10 is illustrated with a vehicle 11 and includes an interior rearview mirror assembly 16 and one or more exterior rearview mirror assemblies, such as driver side exterior rearview mirror assembly 12 and/or passenger side exterior rearview mirror assembly 14 (FIG. 1). Interior rearview mirror assembly 16 includes a digital electrochromic mirror system 18 which is preferably supplied according to the principles disclosed in commonly assigned U.S. Pat. Nos. 6,089,721 and 6,056,410, the disclosures of which are hereby incorporated herein by reference. Although the particulars of the invention are illustrated with an interior rearview mirror assembly 16, it should be understood that the principles of the invention could be equally applied to either or both exterior rearview mirror assemblies 12, 14.

Figure 2:
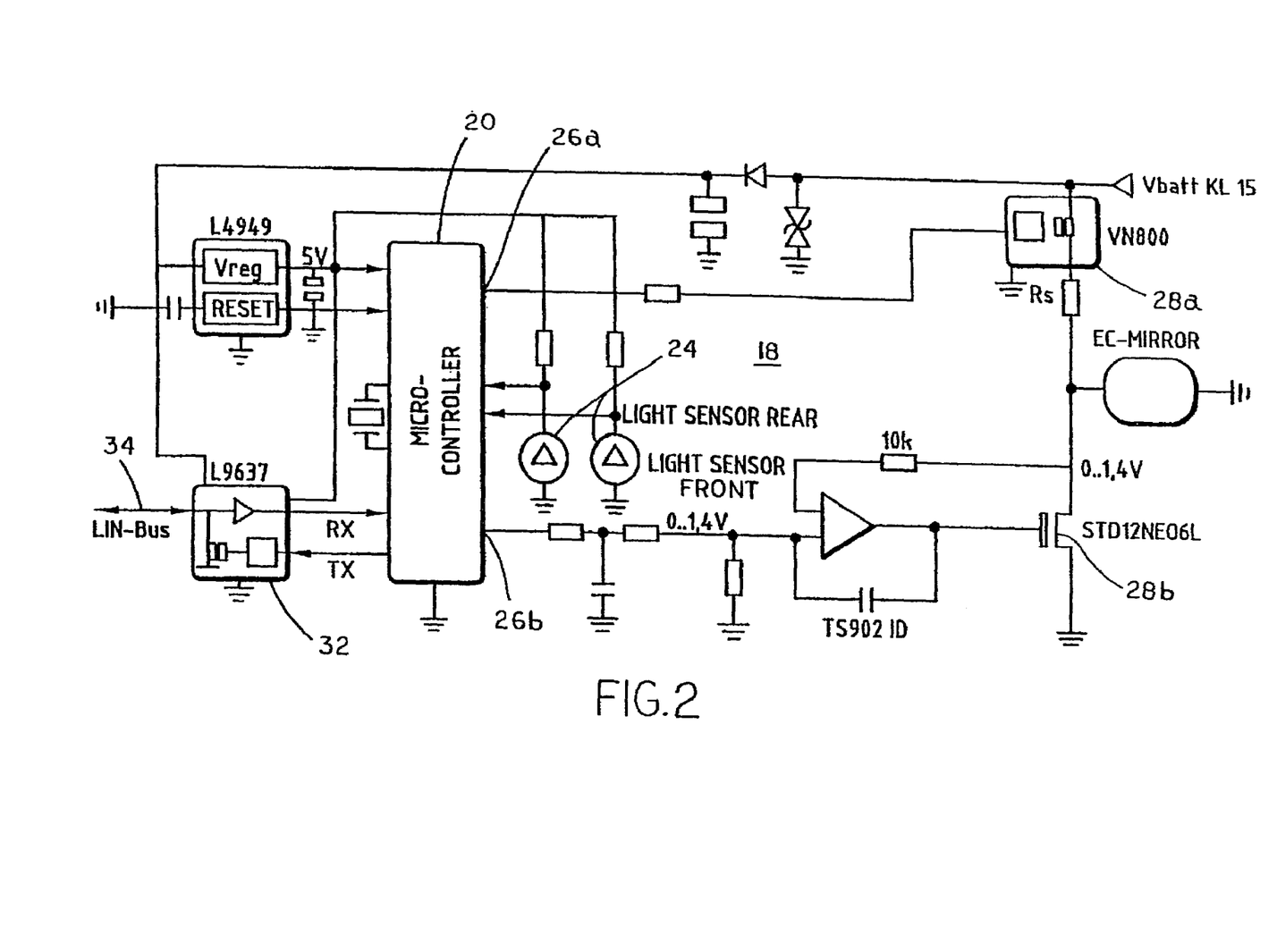
FIG. 2 is an electronic block diagram of a digital electrochromic mirror system, according to the invention.

Digital electrochromic mirror system 18 includes a microcontroller 20 and an electrochromic mirror reflective element 22. As is disclosed in the '721 and '410 patents, microcontroller 20 receives inputs from light sensors 24 (preferably phototransistors or photodiodes) and supplies digital outputs 26a, 26b which control solid-state switches 28a, 28b in order to provide a drive signal at 30 thereby establishing a partial reflectance level of electrochromic reflective element 22. Microcontroller 20 includes a microprocessor.

Figure 3:
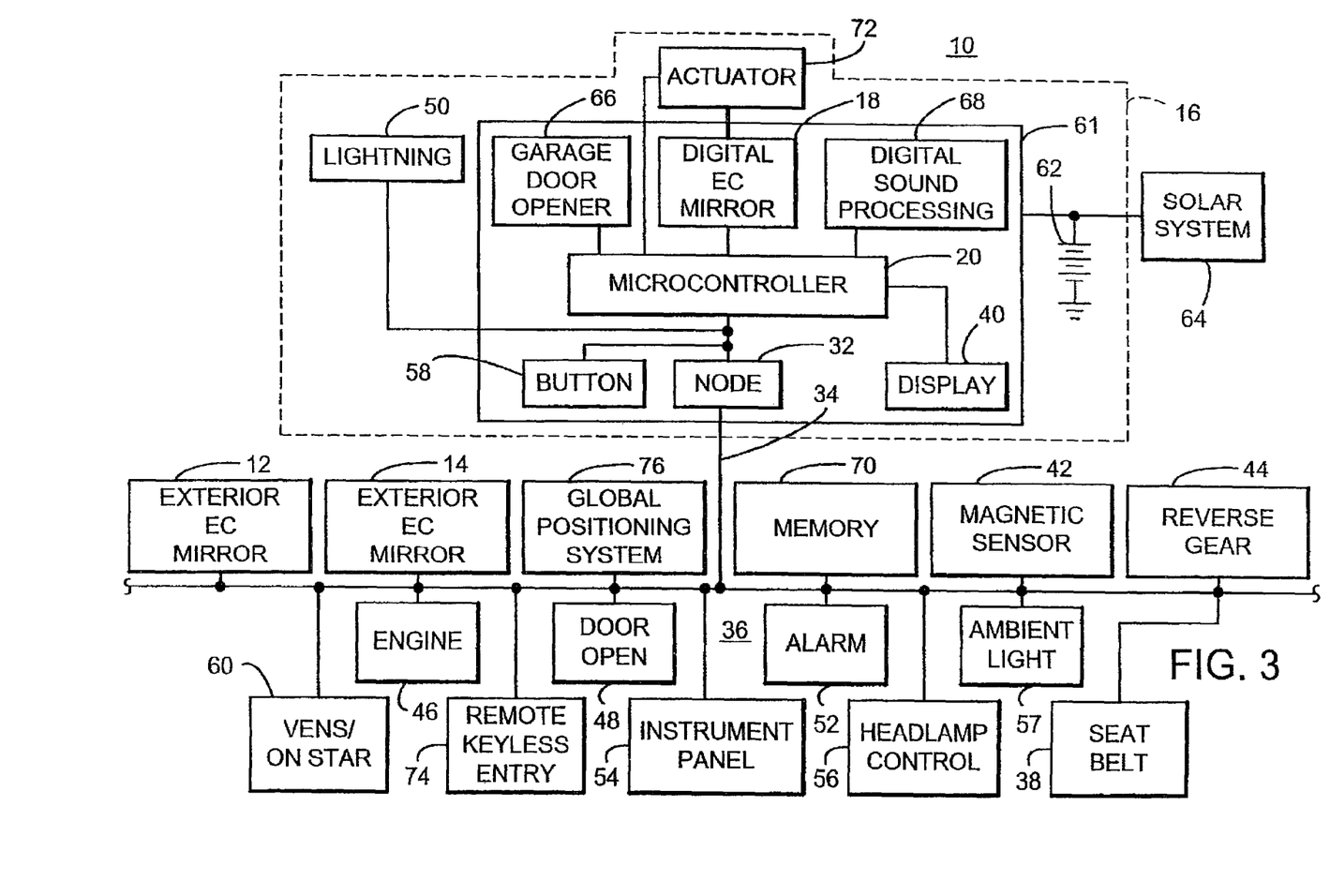
FIG. 3 is an electronic block diagram of a vehicular rearview mirror system, according to the invention.

Digital electrochromic mirror system 18 further includes a bus interface 32 which interfaces with a vehicle network, or bus, 34. Items on network 34 can be connected by wired or wireless connection. Wired connection may include wire, cables, fiber-optic cables, and the like. Wireless connection can be by infrared (IR) or radio-frequency (RF) communication, and, preferably, may be a short-range RF interconnection using the BLUETOOTH protocol. Vehicle network, or bus, 34 may utilize various buss protocols including a Local Internet Network (LIN), a Local Area Network (LAN), a Car (a/k/a Controlled) Area Network (CAN), or other vehicle network protocol. The BLUETOOTH protocol is a low-cost, low-power radio-based cable replacement or wireless link based on short-range radio-based technology. BLUETOOTH enables creation of a short-range (typically 30 feet or so, although longer and shorter ranges are possible), wireless personal area network via small radio transmitters built into various devices. For example, transmission can be on a 2.45 gigahertz band, moving data at about 721 kilobits per second, or faster. In the illustrated embodiment, network 34 is a multi-drop bus which requires three or fewer wires for communication between a plurality of other vehicle functions 36, as illustrated in FIG. 11n situations where timing and power consumption system constraints may cause network 34 wakeup time to be too slow for an automobile maker system response requirement, suitable adjustments may be made in the architecture of network 34. The network may be configured as disclosed in commonly assigned U.S. patent application Ser. No. 09/341,450 filed Jul. 8, 1999, by Drummond et al. for a VEHICLE REARVIEW MIRROR AND A VEHICLE CONTROL SYSTEM INCORPORATING SUCH MIRROR, now U.S. Pat. No. 6,291,905, the disclosure of which is hereby incorporated herein by reference.

Other vehicle functions 36 include, by way of example, a seatbelt warning status 38, which status may be displayed on a minor-based display 40. Preferably, mirror-based display 40 may be located on, at or adjacent interior rearview mirror assembly 16. Minor-based display 40 may be of various forms including that disclosed in commonly assigned U.S. patent application Ser. No. 09/799,414, filed on Mar. 5, 2001, by McCarthy et al., entitled COMPLETE MIRROR-BASED GLOBAL-POSITIONING SYSTEM (GPS) NAVIGATION SOLUTION, now U.S. Pat. No. 6,477,464, the disclosure of which is hereby incorporated herein by reference. Additionally, display 40 may display magnetic vehicle heading information from a magnetic sensor 42, the information being supplied over network 34. Additionally, reverse gear status from a reverse gear sensor 44 may be supplied over network 34 to cause digital electrochromic minor 18 to assume a high reflectance level when vehicle 11 is placed in reverse gear. Rearview mirror system 10 may additionally receive engine information 46 and/or door opener information at 48 over network 34 and activate general lighting 50 located in, at or on interior rearview mirror assembly 16, such as when a door of vehicle 11 is opened. Status from an alarm assembly 52 may also be conveyed over network 34 and displayed by display 40.

Dim ratios, or partial reflectance levels developed from light sensors 24, can be transmitted over network 34 for use to drive exterior minors 12, 14. Optionally, a dim ratio or partial reflectance level chosen for a driver-side exterior minor may be different from (and typically greater than) a dim ratio or partial reflectance level chosen for a passenger-side exterior mirror, and both may be different from a dim ratio or partial reflectance level chosen for a interior electrochromic mirror. Ambient light information, sensed by an ambient light sensor 57, can also be transmitted over network 34 for use in dimming of instrument panel 54 or automatic headlight functions 56. Alternatively, ambient light information can be developed by interior rearview mirror assembly 16 as disclosed in commonly assigned U.S. Pat. No. 5,715,093, the disclosure of which is hereby incorporated herein by reference.

The interior rearview mirror assembly includes microcontroller 20 and a printed circuit board 61, that are common to both the digital electrochromic mirror system 18 and garage door opener function 66. Sharing of components and circuit board space can facilitate a reduction of susceptibility to RF/EMI interference and reduce cost and avoid duplication of both the network interface hardware 32, communication software and some processing power. The interior rearview mirror assembly may also include a video display system, such as disclosed in commonly assigned U.S. patent application Ser. No, 09/793,002, filed Feb. 26, 2001, entitled VIDEO MIRROR SYSTEM INCORPORATING AN ACCESSORY MODULE, now U.S. Pat. No. 6,690,268, the disclosure of which is hereby incorporated herein by reference. Components may be shared between the video display system, the digital electrochromic mirror system and/or the garage door opener. Additionally, microcontroller 20 may control a forward-facing camera system and headlight control which may also share components with the digital electrochromic mirror system and/or the garage door opener. Such forward-facing camera system and headlight control may be of the type disclosed in commonly assigned U.S. Pat. No. 5,796,094 entitled VEHICLE HEADLIGHT CONTROL USING IMAGING SENSOR, the disclosure of which is hereby incorporated herein by reference. An imaging sensor based rain sensor of the type disclosed in commonly assigned U.S. patent application Ser. No. 09/530,306, filed Apr. 27, 2000, entitled RAIN SENSOR WITH FOG DISCRIMINATION, now U.S. Pat. No. 6,353,392, may also be incorporated in circuit board 61 and share components with the digital electrochromic mirror system and/or the garage door opener.

With microcomputer 20 driving digital electrochromic mirror system 18, and with vehicle status information available over network 34, it is possible to have a circuit assembly 61 in or at interior rearview mirror assembly 16 that is powered by a battery 62 that is separate from the vehicle ignition storage battery. As an example, battery 62 may be of a long-life lithium type battery. Moreover, because of its relatively small size, battery 62 may be recharged by a separate dedicated solar-powered rechargeable battery source 64 of the type described in commonly assigned patent application Ser. No. 09/793,002, filed Feb. 26, 2001, entitled VIDEO MIRROR SYSTEMS INCORPORATING AN ACCESSORY MODULE, now U.S. Pat. No. 6,690,268, the disclosure of which is hereby incorporated herein by reference. By powering mirror system 10 by a separate-dedicated solar-powered rechargeable battery source, mirror system 10 can consume power from its dedicated/local battery source, and any power used up during nighttime hours can be replenished by day via solar cell/panel that is a part of battery charger 64 and is connected to the dedicated battery 62 so as to recharge/charge during daytime hours. Furthermore, microcomputer 20 can be put into various power-saving modes thereby enabling electronic assembly 61 to be used for control of a garage door opener 66, such as a HOMELINK™ unit or the universal home access KWIKLINK™ unit.

Also, a mirror-mounted microphone/digital sound-processing system 68, as disclosed in commonly assigned patent application Ser. No. 09/466,010, filed by DeLine et al., on Dec. 17, 1999, for an INTERIOR REARVIEW MIRROR SOUND-PROCESSING SYSTEM, now U.S. Pat. No. 6,420,975, the disclosure of which is hereby incorporated herein by reference, may be also powered by battery 62. Preferably, sound-processing system 68 is incorporated in circuit assembly 61 and, most preferably, shares microcontroller 20 with garage door opener 66 and digital electrochromic mirror 18. Communication button press information 58 can be transmitted over network 34 for various uses by other electronic control units, such as activation of a rescue system 60, such as General Motors' ONSTAR™ system, a Ford Motor Company's RESCU™ system, or the like. Use of digital signal-processing and a single mirror-mounted microphone (such as is described in U.S. patent application Ser. No. 09/396,179, filed Sep. 14, 1999, entitled INDICATOR FOR VEHICLE ACCESSORY, now U.S. Pat. No. 6,278,377, the disclosure of which is incorporated by reference herein) is particularly advantageous for economical achievement of clear and error-free transmission from the vehicle, while operating along a highway, to a remote receiver, particularly in speech-recognition mode. This use of network 34 facilitates location of button 58 in interior mirror assembly 16.

Microcomputer 20 may receive memory information 70 over network 34 and actuate an actuator 72 to position reflective element 24. Principles, disclosed in commonly assigned U.S. Pat. No. 5,796,176 entitled MEMORY MIRROR SYSTEM FOR VEHICLES, the disclosure of which is hereby incorporated herein by reference, may be utilized for communicating such memory information over network 34.

Microcomputer 20 may also use network 34 to measure values of light sensed by light sensors 24, supply drive signals to the electrochromic reflective element, and the like, on the network 34. Partial reflectance levels may be communicated to exterior rearview mirror assemblies 12, 24 over network 34. In this manner, if the interior digital electrochromic mirror system 18 develops a fault, incorrect information will not be transmitted to exterior rearview mirror systems. This also allows exterior reflective elements to have different peak voltages and provides more precise control over each of the mirror assemblies 12, 14, 16.

Other functions may be controlled over network 34 such as remote keyless entry 74 and global positioning system information/navigational system as described in commonly assigned co-pending application Ser. No, 09/799,414, filed on Mar. 5, 2001, by McCarthy et al., entitled COMPLETE MIRROR-BASED GLOBAL-POSITIONING SYSTEM (GPS) NAVIGATION SOLUTION, now U.S. Pat. No. 6,477,464, the disclosure of which is hereby incorporated herein by reference.

In addition to placement at, on or in exterior rearview mirror assembly 18, circuit board 61 may be positioned at a location (and preferably in a housing) separate from interior mirror assemblies, such as disclosed in commonly assigned U.S. Pat. No, 6,099,131 entitled ELECTRO-OPTIC MIRROR SYSTEM, the disclosure of which is hereby incorporated herein by reference.

Also, the concepts of the present invention provides a new and unique combination of a digital electrochromic mirror system, a vehicle accessory and a vehicle network when the vehicle accessory comprises a tire pressure monitoring/display system.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A vehicular rearview mirror system suitable for use in a vehicle, said vehicular rearview mirror system comprising:
    an interior rearview mirror assembly comprising an interior electrochromic reflective element, wherein a reflectance level of said interior electrochromic reflective element is variable responsive to an interior mirror electrochromic reflective element drive signal;
    said interior rearview mirror assembly comprising a control, wherein said control comprises circuitry operable to provide said interior mirror electrochromic reflective element drive signal to said interior electrochromic reflective element;
    said control comprising a bus interface that interfaces with a vehicle bus of a vehicle equipped with said interior rearview mirror assembly;
    wherein said interior rearview mirror assembly comprises a video display operable to display video information for viewing by a driver of the equipped vehicle;
    wherein said vehicular rearview mirror system comprises a forward-facing camera; and
    wherein said control controls at least two of (a) operation of said video display, (b) operation of said forward-facing camera and (c) operation of a headlight control for controlling a headlight of the equipped vehicle.

2. The vehicular rearview mirror system of claim 1, wherein said circuitry shares at least one component associated with at least one of (a) operation of said video display, (b) operation of said forward-facing camera, (c) control of a headlight of the equipped vehicle, (d) operation of a garage door opener, and (e) operation of a rain sensor.

3. The vehicular rearview minor system of claim 2, wherein said at least one component comprises a microprocessor.

4. The vehicular rearview minor system of claim 1, wherein said interior rearview mirror assembly comprises a garage door opener and wherein said garage door opener is at least partially controlled by said control.

5. The vehicular rearview mirror system of claim 4, wherein said control shares at least one of a component and circuitry with said garage door opener.

6. The vehicular rearview mirror system of claim 1, wherein said control comprises digital circuitry operable to provide said interior mirror electrochromic reflective element drive signal to said interior electrochromic reflective element.

7. The vehicular rearview mirror system of claim 1, wherein said circuitry comprises digital circuitry.

8. The vehicular rearview mirror system of claim 7, wherein said digital circuitry comprises a microprocessor.

9. The vehicular rearview mirror system of claim 1, wherein said control is operable to receive information via said vehicle bus via at least one of a wire, a cable and a fiber-optic connection.

10. The vehicular rearview mirror system of claim 1, wherein said vehicle bus comprises at least one of (a) a CAN bus, (b) a LIN bus and (c) a LAN bus.

11. The vehicular rearview mirror system of claim 1, wherein said interior rearview mirror assembly comprises said forward-facing camera.

12. The vehicular rearview mirror system of claim 1, wherein said control is associated with at least one other accessory.

13. The vehicular rearview mirror system of claim 12, wherein said at least one other accessory comprises at least one of (a) circuitry associated with an instrument panel of the equipped vehicle, (b) an element of a remote keyless entry system of the equipped vehicle, (c) an element of an information system of the equipped vehicle, (d) an element of a navigation system of the equipped vehicle, (e) an element of a global-positioning system of the equipped vehicle and (f) an element of a telematics system of the equipped vehicle.

14. The vehicular rearview mirror system of claim 12, wherein said at least one other accessory comprises an element of a remote keyless entry system of the equipped vehicle.

15. The vehicular rearview mirror system of claim 12, wherein said at least one other accessory comprises an exterior rearview mirror assembly that includes an exterior electrochromic reflective element that has its reflectance level variable responsive to an exterior mirror electrochromic reflective element drive signal, and wherein said control is operable to provide said exterior mirror electrochromic reflective element drive signal to said exterior electrochromic reflective element via said vehicle bus.

16. The vehicular rearview mirror system of claim 15, wherein said reflectance level of said interior electrochromic reflective element as varied responsive to said interior mirror electrochromic reflective element drive signal differs from said reflectance level of said exterior electrochromic reflective element as varied responsive to said exterior mirror electrochromic reflective element drive signal.

17. The vehicular rearview minor system of claim 1, wherein said control is responsive to reverse gear information sent via said vehicle bus.

18. The vehicular rearview mirror system of claim 17, wherein, responsive to said reverse gear information, said control establishes a high reflectance level of said interior electrochromic reflective element when a reverse gear of the equipped vehicle is selected.

19. The vehicular rearview mirror system of claim 1, wherein said interior rearview mirror assembly includes a user actuatable element.

20. The vehicular rearview mirror system of claim 19, wherein actuation of said user actuatable element is communicated via said vehicle bus.

21. The vehicular rearview mirror system of claim 1, wherein said circuitry shares at least one component associated with a rain sensor.

22. The vehicular rearview mirror system of claim 21, wherein said rain sensor comprises an image-based rain sensor.

23. The vehicular rearview mirror system of claim 1, wherein said control is operable to receive information via said vehicle bus.

24. The vehicular rearview mirror system of claim 1, wherein said interior rearview mirror assembly comprises at least one of (a) a microphone and (b) a sound processor.

25. The vehicular rearview minor system of claim 1, wherein said interior rearview mirror assembly comprises an input for a telematics system of the vehicle.

26. A vehicular rearview mirror system suitable for use in a vehicle, said vehicular rearview mirror system comprising:
an interior rearview mirror assembly comprising an interior electrochromic reflective element, wherein a reflectance level of said interior electrochromic reflective element is variable responsive to an interior mirror electrochromic reflective element drive signal;
said interior rearview minor assembly comprising a control, wherein said control comprises circuitry operable to provide said interior mirror electrochromic reflective element drive signal to said interior electrochromic reflective element;
said control comprising a bus interface that interfaces with a vehicle bus of a vehicle equipped with said interior rearview mirror assembly;
wherein said interior rearview mirror assembly comprises a video display operable to display video information for viewing by a driver of the equipped vehicle;
wherein said interior rearview minor assembly comprises a forward-facing camera;
wherein said control controls at least one of (a) operation of said video display, (b) operation of said forward-facing camera and (c) operation of a headlight control for controlling a headlight of the equipped vehicle; and
wherein said control is responsive to reverse gear information sent via said vehicle bus.

27. The vehicular rearview mirror system of claim 26, wherein, responsive to said reverse gear information, said control establishes a high reflectance level of said interior electrochromic reflective element when a reverse gear of the equipped vehicle is selected.

28. The vehicular rearview minor system of claim 26, wherein said circuitry shares at least one component associated with at least one of (a) operation of said video display, (b) operation of said forward-facing camera, (c) control of a headlight of the equipped vehicle, (d) operation of a garage door opener, and (e) operation of a rain sensor.

29. The vehicular rearview mirror system of claim 26, wherein said interior rearview mirror assembly includes a user actuatable element, and wherein actuation of said user actuatable element is communicated via said vehicle bus.

30. The vehicular rearview mirror system of claim 26, wherein said control is operable to receive information via said vehicle bus.

31. A vehicular rearview minor system suitable for use in a vehicle, said vehicular rearview minor system comprising;
   an interior rearview mirror assembly comprising an interior electrochromic reflective element, wherein a reflectance level of said interior electrochromic reflective element is variable responsive to an interior minor electrochromic reflective element drive signal;
   said interior rearview minor assembly comprising a control, wherein said control comprises circuitry operable to provide said interior mirror electrochromic reflective element drive signal to said interior electrochromic reflective element;
   said control comprising a bus interface that interfaces with a vehicle bus of a vehicle equipped with said interior rearview minor assembly;
   wherein said interior rearview mirror assembly comprises a forward-facing camera;
   wherein said control controls at least one of (a) operation of said forward-facing camera and (b) operation of a headlight control for controlling a headlight of the equipped vehicle; and
   wherein said circuitry shares at least one component associated with at least one of (a) operation of said forward-facing camera, (b) control of a headlight of the equipped vehicle, (c) operation of a garage door opener, and (d) operation of a rain sensor.

32. The vehicular rearview mirror system of claim 31, wherein said interior rearview mirror assembly includes a user actuatable element, and wherein actuation of said user actuatable element is communicated via said vehicle bus.

33. The vehicular rearview mirror system of claim 31, wherein said control is operable to receive information via said vehicle bus.

34. The vehicular rearview mirror system of claim 31, wherein said interior rearview mirror assembly comprises a video display operable to display video information for viewing by a driver of the equipped vehicle.

35. The vehicular rearview minor system of claim 34, wherein said control controls operation of said video display.

36. The vehicular rearview mirror system of claim 34, wherein said circuitry shares at least one component associated with operation of said video display.

37. A vehicular rearview minor system suitable for use in a vehicle, said vehicular rearview mirror system comprising:
   an interior rearview mirror assembly comprising an interior electrochromic reflective element, wherein a reflectance level of said interior electrochromic reflective element is variable responsive to an interior mirror electrochromic reflective element drive signal;
   said interior rearview mirror assembly comprising a control, wherein said control comprises circuitry operable to provide said interior mirror electrochromic reflective element drive signal to said interior electrochromic reflective element;
   said control comprising a bus interface that interfaces with a vehicle bus of a vehicle equipped with said interior rearview mirror assembly;
   wherein said interior rearview mirror assembly comprises a forward-facing camera;
   wherein said control controls at least one of (a) operation of said forward-facing camera and (b) operation of a headlight control for controlling a headlight of the equipped vehicle; and
   wherein said control is operable to receive information via said vehicle bus and wherein said vehicle bus comprises at least one of (a) a CAN bus, (b) a LIN bus and (c) a LAN bus.

38. The vehicular rearview mirror system of claim 37, wherein said interior rearview mirror assembly includes a user actuatable element, and wherein actuation of said user actuatable element is communicated via said vehicle bus.

39. The vehicular rearview minor system of claim 37, wherein said interior rearview mirror assembly comprises a video display operable to display video information for viewing by a driver of the equipped vehicle, and wherein at least one of (a) said control controls operation of said video display and (b) said control shares at least one component associated with operation of said video display.

40. The vehicular rearview mirror system of claim 37, wherein said control shares at least one component associated with at least one of (a) operation of said forward-facing camera, (b) control of a headlight of the equipped vehicle, (c) operation of a garage door opener, and (d) operation of a rain sensor.

41. The vehicular rearview mirror system of claim 37, wherein said control is operable to receive information via said vehicle bus via at least one of a wire, a cable and a fiber-optic connection.

42. The vehicular rearview mirror system of claim 37, wherein said control is responsive to reverse gear information sent via said vehicle bus.

43. The vehicular rearview minor system of claim 37, wherein said interior rearview mirror assembly comprises at least one of (a) a microphone and (b) a sound processor.

44. The vehicular rearview mirror system of claim 37, wherein said interior rearview mirror assembly comprises an input for a telematics system of the vehicle.

* * * * *

UNITED STATES PATENT AND TRADEMARK OFFICE
CERTIFICATE OF CORRECTION

| | |
|---|---|
| PATENT NO. | : 8,362,885 B2 |
| APPLICATION NO. | : 13/276655 |
| DATED | : January 29, 2013 |
| INVENTOR(S) | : John P. Drummond et al. |

It is certified that error appears in the above-identified patent and that said Letters Patent is hereby corrected as shown below:

In the Specification

Column 2
Line 51, "Components" should be -- components --

Column 4
Line 1, "FIG. 11n" should be -- Fig. 3. In --
Line 14, "minor" should be -- mirror --
Line 16, "minor" should be -- mirror --
Line 27, "minor" should be -- mirror --
Line 38, "minors" should be -- mirrors --
Line 39, "minor" should be -- mirror --

In the Claims

Column 7
Line 9, Claim 3, "minor" should be -- mirror --
Line 12, Claim 4, "minor" should be -- mirror --

Column 8
Line 3, Claim 17, "minor" should be -- mirror --
Line 29, Claim 25, "minor" should be -- mirror --
Line 39, Claim 26, "minor" should be -- mirror --
Line 50, Claim 26, "minor" should be -- mirror --
Line 63, Claim 28, "minor" should be -- mirror --

Column 9
Line 10, Claim 31, "minor" should be -- mirror --
Line 11, Claim 31, "minor" should be -- mirror --

Signed and Sealed this
Eleventh Day of March, 2014

Michelle K. Lee
*Deputy Director of the United States Patent and Trademark Office*

CERTIFICATE OF CORRECTION (continued)
U.S. Pat. No. 8,362,885 B2

Line 15, Claim 31, "minor" should be -- mirror --
Line 17, Claim 31, "minor" should be -- mirror --
Line 24, Claim 31, "minor" should be -- mirror --
Line 47, Claim 35, "minor" should be -- mirror --
Line 52, Claim 37, "minor" should be -- mirror --

Column 10
Line 28, Claim 39, "minor" should be -- mirror --
Line 48, Claim 43, "minor" should be -- mirror --